United States Patent
Park et al.

(10) Patent No.: US 7,935,429 B2
(45) Date of Patent: May 3, 2011

(54) NON-PVC FLOORING MADE OF THERMO PLASTIC ELASTOMER AND METHOD FOR PRODUCING THE SAME

(75) Inventors: Jong-Dae Park, Ulsan (KR); Woo-Jin Jung, Ulsan (KR); Bo-Soo Hwang, Ulsan (KR); Jun-Hyoung Kim, Ulsan (KR)

(73) Assignee: LG Chem, Ltd. (KR)

( * ) Notice: Subject to any disclaimer, the term of this patent is extended or adjusted under 35 U.S.C. 154(b) by 676 days.

(21) Appl. No.: 11/281,647

(22) Filed: Nov. 17, 2005

(65) Prior Publication Data

US 2006/0105189 A1 May 18, 2006

(30) Foreign Application Priority Data

Nov. 18, 2004 (KR) .................. 10-2004-0094413

(51) Int. Cl.
*B32B 5/00* (2006.01)
*B32B 27/08* (2006.01)
(52) U.S. Cl. ............... 428/517; 428/519; 264/241
(58) Field of Classification Search ............ 428/519, 428/517; 264/241
See application file for complete search history.

(56) References Cited

U.S. PATENT DOCUMENTS

| | | | | |
|---|---|---|---|---|
| 5,180,780 A | * | 1/1993 | Nakamura et al. | 525/96 |
| 5,597,867 A | * | 1/1997 | Tsujimoto et al. | 525/74 |
| 5,616,420 A | * | 4/1997 | Yamaoka et al. | 428/515 |
| 6,005,050 A | * | 12/1999 | Okada et al. | 525/68 |
| 6,093,767 A | * | 7/2000 | Davis et al. | 524/492 |

FOREIGN PATENT DOCUMENTS

| | | | |
|---|---|---|---|
| JP | 9-124887 | | 5/1997 |
| JP | 2001-064410 | * | 3/2001 |
| KR | 2001053879 | * | 7/2001 |
| KR | 2002058705 | * | 7/2002 |

* cited by examiner

*Primary Examiner* — Kevin R. Kruer
(74) *Attorney, Agent, or Firm* — Cantor Colburn LLP (57) ABSTRACT

Disclosed herein is a method for producing a transparent or opaque flooring sheet or a flooring using a styrene-butadiene copolymer resin (as a thermoplastic elastomer) by calendering. The flooring causes no problems associated with environmental hormones, and generates no halogen gases or endocrine disruptors, such as dioxin, during incineration. Further, the flooring can be regenerated and reused at any time, and exhibits superior stability upon installation and mounting and excellent elastic restoration after application of stress due to inherent flexibility of rubber.

5 Claims, 5 Drawing Sheets

NON-PVC FLOORING MADE OF THERMO PLASTIC ELASTOMER AND METHOD FOR PRODUCING THE SAME

This application claims the benefit of the filing date of Korean Patent Application No. 10-2004-0094413 filed on Nov. 18, 2004 in the Korean Intellectual Property Office, the disclosure of which is incorporated herein in their entirety by reference.

TECHNICAL FIELD

The present invention relates to a method for producing a flooring sheet or a flooring using a hydrogenated styrene-butadiene copolymer thermoplastic elastomer (TPE) by calendering, and more particularly to a flooring causing no problems associated with environmental hormones arising from the use of plasticizers in conventional polyvinyl chloride (PVC) resins and dioxin generated during incineration of PVC resins.

BACKGROUND ART

There have been various attempts to develop non-polyvinyl chloride (non-PVC) floorings. However, since non-PVC floorings suffer from many problems, such as difficult production, poor installation and high price, they are not yet suitable for practical use. In recent years, floorings using polyolefin resins have been developed and introduced into the market in Japan.

However, polyolefin resins, including polypropylene and polyethylene, have no adhesion to inks, surface treatment agents and other components due to the absence of polar components in the resins. Accordingly, production of polyolefin floorings essentially involves various complicated processes, such as corona treatment and primer treatment, for sufficient adhesion to inks and surface treatment agents. Further, viscosity characteristics of polyolefin resins are drastically deteriorated during melting above specific temperatures, and thus polyolefin resins cannot be substantially molded into sheets by calendering. Accordingly, the use of an extruder, e.g., a T-die, is inevitable, leading to a serious deterioration in productivity.

Although processing of polypropylene and ethylene-propylene rubbers has been recently performed by calendering, the problem of poor adhesion to inks and surface treatment agents still remains unsolved.

DISCLOSURE

Technical Problem

It is one object of the present invention to provide a flooring using a thermoplastic elastomer by calendering wherein the thermoplastic elastomer is easily molded by calendering and has superior adhesion to inks and surface treatment agents, enabling lamination with a transparent sheet by conventional processes, e.g., thermal lamination, without additional treatments (e.g., corona and primer treatments).

It is another object of the present invention to provide a method for producing the flooring.

Technical Solution

In accordance with one aspect of the present invention, there is provided a non-polyvinyl chloride flooring that can be produced utilizing conventional calendering equipment without the need for additional equipment. Specifically, the flooring of the present invention is characterized in that constituent sheets are compatible with gravure ink (butadienes) for rubber and can be adhered to urethane-acrylate photocurable resins. Accordingly, the non-polyvinyl chloride flooring of the present invention can be produced by conventional processes without causing environmental pollution problems.

Preferably, the styrene-butadiene copolymer has a polystyrene content of 50 wt % to 95 wt %.

General styrene-butadiene block copolymers and graft copolymers exhibit adhesion to ink and urethane-acrylate resins to some extent. However, since general styrene-butadiene block copolymers and graft copolymers are susceptible to aging and heat discoloration due to the presence of double bonds in the butadiene, they cannot be substantially applied to floorings.

To solve these problems, hydrogenated styrene-ethylene-butadiene-styrene (SEBS) copolymer resins have been introduced. Since hydrogenated SEBS is prepared by hydrogenation of a styrene-butadiene block copolymer, it is free of double bonds. When hydrogenated SEBS is applied to the production of floorings, however, it exhibits poor adhesion to inks and surface treatment agents.

In the present invention, a hydrogenated styrene-butadiene copolymer (H-SBR) is used as a base instead of SEBS. H-SBR is a resin prepared by hydrogenation (hydrogen addition reaction) of a styrene-butadiene random copolymer. The use of H-SBR in the flooring of the present invention provides resistance to aging and heat discoloration arising from long-term use.

The reason why H-SBR has good adhesion to inks and surface treatment agents is that H-SBR includes 50% by weight or more of polystyrene, unlike SEBS. When a certain amount of polystyrene is added to H-SBR, the adhesive strength is further increased. The use of H-SBR enables molding of highly heat-resistant transparent layers, printed layers and non-foamed layers in a sheet state by calendering, which could not be achieved by conventional resins. The sheets thus obtained can be thermally laminated in a simple manner to produce the final flooring of the present invention.

The flooring of the present invention has advantages that inks and surface treatment agents can be freely applied to the flooring, no corona and or primer treatment is required, and respective constituent layers can be thermally laminated in a simple manner.

DESCRIPTION OF DRAWINGS

The above and other objects, features and other advantages of the present invention will be more clearly understood from the following detailed description taken in conjunction with the accompanying drawings, in which.

BEST MODE

Figure 1:
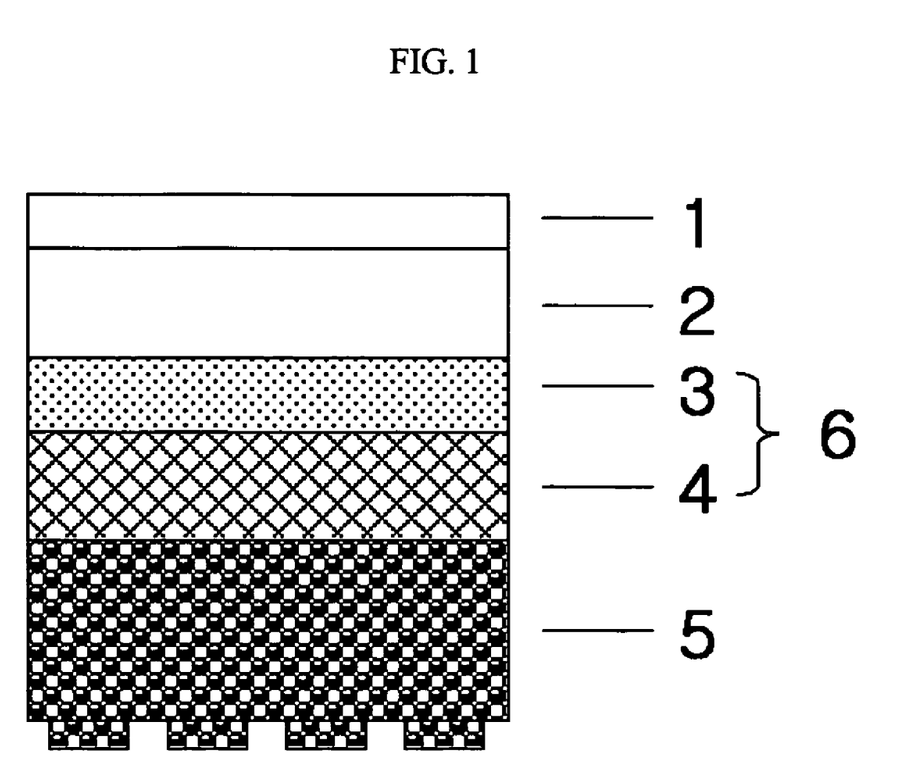
FIG. 1 is a cross-sectional view showing the structure of a flooring according to the present invention.

A flooring of the present invention has a structure wherein a plurality of layers are formed by calendering and laminated to each other. As shown in FIG. 1, the flooring of the present invention is composed of surface layers, a base layer and a back surface layer laminated in this order from the top to the bottom. The surface layers include a printed layer 3, a transparent layer 2 and a surface treatment layer 1 laminated in this order from the top to the bottom. A dimension-reinforcing layer 4 is formed as the base layer. A non-foamed layer 5 or a foamed layer is formed as the back surface layer.

If desired, the printed layer 3 and the surface treatment layer 1 of the surface layers may be omitted. The surface layers and the back surface layer can be embossed for the purpose of imparting a high surface quality to the flooring of the present invention.

At least one layer of the constituent layers contains a hydrogenated styrene-butadiene copolymer resin.

Preferably, at least one layer selected from the transparent layer 2, the printed layer 3 and the non-foamed layer 5 contains:

a) 1 to 70 parts by weight of a hydrogenated styrene-butadiene copolymer resin;

b) 1 to 200 parts by weight of a styrene-butadiene block copolymer resin; and c) 1 to 70 parts by weight of polystyrene.

Since the hydrogenated styrene-butadiene copolymer is free of double bonds, it has superior heat resistance. However, the use of an excess of the hydrogenated styrene-butadiene copolymer causes a marked increase in hardness and is economically disadvantageous due to high price. Accordingly, the amount of the hydrogenated styrene-butadiene copolymer is limited to 70 parts by weight or less. In addition, the styrene-butadiene block copolymer resin is used for cost saving of the entire materials used. The polystyrene is used to improve the adhesion to inks and the lamination between the constituent layers. When the polystyrene is used in an amount exceeding 70 parts by weight, the problem of poor dispersibility arises during calendering. Accordingly, the polystyrene is limited to 70 parts by weight or less.

The resin a) preferably has a polystyrene content not less than 50% by weight and a melt index (MI, 200° C., 5 kg) of 2~10 g/10 minutes.

When the resin a) has an MI of less than 2, it has poor flowability, which is unsuitable for calendering of the resin. On the other hand, when the resin a) has an MI exceeding 10, it has greatly increased flowability and thus the resin is highly sensitive to temperature changes, which makes calendering of the resin difficult.

The resin b) preferably has a polystyrene content not less than 30% by weight and a melt index (MI, 200° C., 5 kg) of 2~10 g/10 minutes.

When the resin b) has an MI of less than 2, it has poor flowability, which is unsuitable for calendering of the resin. Particularly, the use of a filler for the purpose of cost saving drastically lowers the flowability, causing difficulty in use. On the other hand, when the resin b) has an MI exceeding 10, it has greatly increased flowability and thus the resin is highly sensitive to temperature changes, which makes calendering of the resin difficult.

In addition, the layer may further contain 0.1~3 parts by weight of a UV stabilizer, 0.15 parts by weight of an antioxidant and 0.1~3 parts by weight of a lubricant as additives.

When the UV stabilizer and the antioxidant are used in excessive amounts, the physical properties of the layer are excellent. However, considering the price of the additives is high, the amounts of the UV stabilizer and the antioxidant are limited to 3 and 5 parts by weight, respectively. In addition, it is most preferred to use the lubricant in an amount of 0.3 to 1.0 parts by weight. When the lubricant is used in an amount of more than 1.0 part by weight, the layer is excessively activated and thus flows down along a calender roll without sticking. Further, there is a danger that the surface state of the layer may be worsened. Accordingly, the amount of the lubricant is limited to 3 parts by weight or less.

Functions and compositions of the respective constituent layers are as follows.

The surface treatment layer 1 acts to prevent the surface of the flooring from being contaminated and scratched, and to maintain a clean surface. The surface treatment layer 1 is composed of a common photocurable urethane acrylate.

The transparent layer 2 underlying the surface treatment layer 1 functions to protect a pattern printed on the printed layer 3. The transparent layer 2 is composed of 1~70 parts by weight of a hydrogenated styrene-butadiene copolymer, 1~200 parts by weight of a styrene-butadiene block copolymer, 1~70 parts by weight of a polystyrene resin, 0.1~3 parts by weight of a UV stabilizer, 0.15 parts by weight of first and second antioxidants, and 0.1~3 parts by weight of a lubricant.

The printed layer 3 is a layer on which various patterns are printed. The printed layer 3 is composed of 1~70 parts by weight of a hydrogenated styrene-butadiene copolymer, 1~200 parts by weight of a styrene-butadiene block copolymer, 1~70 parts by weight of a polystyrene resin for improving lamination between layers, 10~100 parts by weight of talc for increasing adhesion to inks, 150 parts by weight of titanium dioxide as a white pigment for imparting color coverage, 0.1~3 parts by weight of a UV stabilizer, 0.1~3 parts by weight of first and second antioxidants, and 0.1~3 parts by weight of a lubricant.

The sol-impregnated dimension-reinforcing layer 4 acts to reinforce the dimensional stability of the flooring according to the present invention. The sol-impregnated dimension-reinforcing layer 4 is preferably formed by impregnating a glass fiber with a styrene-butadiene latex, an ethylene-vinylacetate sol having a solid content of 50 wt % or more, a water-dispersed urethane sol, or the like, instead of a polyvinyl chloride sol that has been used until now.

The impregnation of the glass fiber with a sol enables easy lamination between the printed layer and the non-foamed layer. When the solid content exceeds 70 wt %, the sol-impregnated dimension-reinforcing layer 4 can replace the printed layer 3 and thus the printed layer 3 may be unnecessary. The sol is preferably composed of 30~70 parts by weight of the resin, 30~70 parts by weight of water as a dispersant, 1~50 parts by weight of talc as a filler, 120 parts by weight of titanium dioxide as a white pigment for imparting color coverage, 0.13 parts by weight of a UV stabilizer, 0.1~5 parts by weight of first and second antioxidants, and 0.1~3 parts by weight of a lubricant.

The non-foamed layer 5 determines the thickness of the final flooring product, and prevents the printed layer from being in direct contact with the bottom, thus serving to protect the printed layer from irregularities and moisture formed on the bottom. The non-foamed layer 5 is composed of 170 parts by weight of a hydrogenated styrene-butadiene copolymer, 1~200 parts by weight of a styrene-butadiene block copolymer rubber, 1~70 parts by weight of polystyrene for improving lamination between layers, 10~150 parts by weight of talc for increasing adhesion to inks, 150 parts by weight of titanium as a white pigment for imparting color coverage, 0.1~5 parts by weight of an antioxidant, and 0.13 parts by weight of a lubricant.

The present invention also provides a method for producing a flooring, comprising the steps of:

a) forming a transparent layer and a printed layer containing a hydrogenated styrene-butadiene copolymer resin;

b) forming a non-foamed layer containing a hydrogenated styrene-butadiene copolymer resin;

c) impregnating a dimension-reinforcing material with a styrene-butadiene latex, an ethylene-vinylacetate sol or a water-dispersed urethane sol, and thermally laminating the printed layer thereto;

d) printing a pattern on the surface of the laminate obtained in step c);

e) thermally laminating the transparent layer to the laminate obtained in step d);

f) thermally laminating the non-foamed layer to the laminate obtained in step e); and g) treating the laminate obtained in step g) with a surface treatment agent, and embossing the back surface of the laminate.

Figure 2:
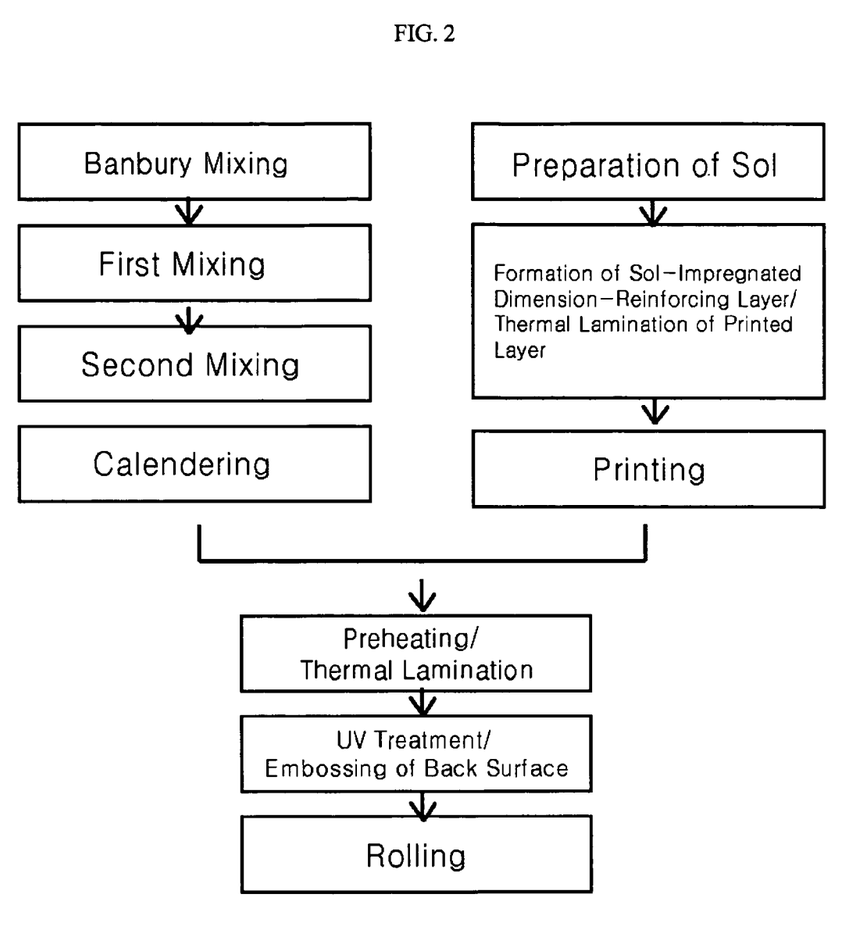
FIG. 2 is a flow chart showing the procedure of a method for producing a flooring according to the present invention.

The constituent layers of the flooring of the present invention except the dimension-reinforcing layer 4 are formed by calendering. FIG. 2 is a flow chart showing the procedure of the method for producing the flooring by calendering. The method essentially comprises the steps of uniformly gelling (mixing) respective raw materials under pressure while heating and calendering the gelled mixture into sheets.

In order to form the respective constituent layers of the flooring according to the present invention, respective raw materials in a liquid, powder or pellet state are uniformly mixed and dispersed using a rotor in a Banbury mixer at 80~140° C.

Each of the mixtures is subjected to a first mixing and a second mixing in a 2-roller roll at 120~150° C., and is then formed into a sheet having a thickness of 0.1~1.0 mm using a reverse L-type 4-roller roll calender. The dimension-reinforcing layer 4 is formed by impregnating a glass fiber with a styrene-butadiene latex, an ethylene-vinylacetate sol having a solid content of 50 wt % or more, a water-dispersed urethane sol, or the like, using a roll coater, and passing the impregnated glass fiber through an oven to dryness. Thereafter, the dimension-reinforcing layer 4 and the printed layer 3 formed by calendering are thermally laminated to each other, and a pattern is then printed on the printed layer 3 by gravure, screen or transfer printing.

The printed layer 3 and the non-foamed layer 5 are thermally laminated to each other by passing the layers through an embossing roll. Separately, the transparent layer 2 is preheated in a heating drum at 120~160° C. Thereafter, the laminate of the printed layer 3 and the non-foamed layer 5 is thermally laminated to the preheated transparent layer 2 by passing through an embossing roll.

After the resulting laminate is cooled, it is coated with a photocurable resin and passed through a UV curing machine to form a surface treatment layer, thereby completing the production of the finished flooring. If necessary, the non-foamed layer 5 formed on the back surface of the final flooring is preheated using a far-infrared heater at 100~600° C. and passed through an embossing roll having predetermined irregularities to form a desired pattern thereon.

The present invention will now be described in more detail with reference to the following examples. However, these examples are given for the purpose of illustration and are not to be construed as limiting the scope of the invention.

MODE FOR INVENTION

Examples

Constituent layers of a flooring according to the present invention other than a dimension-reinforcing layer were formed by calendering.

1. Formation of Transparent Layer

To form a transparent layer 2, the following raw materials were mixed: 50 parts by weight of a hydrogenated styrene-butadiene copolymer rubber (SS L601, Asahi, Japan) having a polystyrene content of 70 wt % and a melt index (MI) of 10, 70 parts by weight of a first styrene-butadiene block copolymer rubber (LG604, LG Chem., Korea) having a polystyrene content of 40 wt % and a melt index (MI) of 8, 70 parts by weight of a second styrene-butadiene block copolymer rubber (KTR-301, Kumho Petrochemical Co., Ltd. Korea) having a polystyrene content of 41 wt % and a melt index (MI) of 6, 30 parts by weight of polystyrene (25SPE, LG Chem., Korea), 0.7 parts by weight of a UV stabilizer (Hisorb 327, LG Chem., Korea), 0.5 parts by weight of a first antioxidant (Songnox 2450, Songwon Industrial Co., Ltd. Korea), 0.8 parts by weight of a second antioxidant (Songnox P-EPQ, Songwon Industrial Co., Ltd. Korea), and 0.5 parts by weight of Zn-St as a lubricant (Songwon Industrial Co., Ltd. Korea). The mixture was mixed in a Banbury mixer at 130° C., and then subjected to first mixing and second mixing in a 2-roller roll at 140° C. Thereafter, the resulting mixture was formed into a transparent layer 2 having a thickness of 0.3 mm using a calender roll at 165° C.

2. Formation of Printed Layer

To form a printed layer 3, the following raw materials were mixed: 50 parts by weight of a hydrogenated styrene-butadiene copolymer rubber (SS L601, Asahi, Japan) having a polystyrene content of 70 wt % and a melt index (MI) of 10, 100 parts by weight of a first styrene-butadiene block copolymer rubber (KTR-201, Kumho Petrochemical Co., Ltd. Korea) having a polystyrene content of 31.5 wt % and a melt index (MI) of 6, 20 parts by weight of polystyrene (25SPE, LG Chem., Korea), 50 parts by weight of talc as a filler, 20 parts by weight of rutile-type titanium dioxide as a white pigment, 0.5 parts by weight of a UV stabilizer (Hisorb 327, LG Chem., Korea), 0.5 parts by weight of a first antioxidant (Songnox 2450, Songwon Industrial Co., Ltd. Korea), 0.5 parts by weight of a second antioxidant (Songnox P-EPQ, Songwon Industrial Co., Ltd. Korea), and 0.3 parts by weight of Zn-St as a lubricant (Songwon Industrial Co., Ltd. Korea). The mixture was mixed in a Banbury mixer at 130° C., and then subjected to first mixing and second mixing in a 2-roller roll at 140° C. Thereafter, the resulting mixture was formed into a printed layer 3 having a thickness of 0.2 mm using a calender roll at 155° C.

3. Formation of Non-Foamed Layer

A non-foamed layer 5 was formed in the same manner as in the formation of the printed layer 3, except that raw materials having the following composition were used: 30 parts by weight of a hydrogenated styrene-butadiene copolymer rubber (SS L601, Asahi, Japan) having a polystyrene content of 70 wt % and a melt index (MI) of 10, 70 parts by weight of a styrene-butadiene block copolymer rubber (LG604, LG Chem., Korea) having a polystyrene content of 40 wt % and a melt index (MI) of 8, 10 parts by weight of polystyrene (25SPE, LG Chem., Korea), 50 parts by weight of talc as a filler, 50 parts by weight of triphenylphosphate (Daihachi, Japan) as a flame retardant, 30 parts by weight of antimony trioxide, 100 parts by weight of aluminum hydroxide, 5 parts by weight of anatase-type titanium dioxide as a white pigment, 0.3 parts by weight of a first antioxidant (Songnox 2450, Songwon Industrial Co., Ltd. Korea), 0.3 parts by weight of a second antioxidant (Songnox P-EPQ, Songwon Industrial Co., Ltd. Korea), and 0.3 parts by weight of Zn-St as a lubricant (Songwon Industrial Co., Ltd. Korea). The mixture was mixed in a Banbury mixer at 130° C., and then subjected to first mixing and second mixing in a 2-roller roll at 140° C. Thereafter, the resulting mixture was formed into a non-foamed layer 5 having a thickness of 1.0 mm using a calender roll at 155° C.

4. Formation of Dimension-Reinforcing Layer

A water-dispersed urethane binder (viscosity: 800 cps) consisting of 50 parts by weight of solids and 50 parts by weight of water was used as an impregnation sol for forming a dimension-reinforcing layer 4. A glass fiber was impregnated with the binder using a roll coater to form a dimension-reinforcing layer 4.

5. Formation of Printed Sol-Impregnated Dimension-Reinforcing Layer

The printed layer 3 was thermally laminated on the dimension-reinforcing layer 4 by passing the layers through an embossing roll at 140~155° C., and then a pattern was printed on the printed layer 3 to form a printed sol-impregnated dimension-reinforcing layer 6.

6. Production of Final Flooring by Thermal Lamination

The non-foamed layer 5, the transparent layer 2 and the printed sol-impregnated dimension-reinforcing layer 6 were passed through a heating drum at 140~160° C. to preheat the layers, and passed through an embossing roll to thermally laminate the layers to produce the final flooring having a thickness of 1.8 mm.

7. Surface Treatment/Back Surface Embossing

After the final flooring was coated with a photocurable urethane acrylate resin, it was cured by passing through a UV lamp to form a surface treatment layer 1 thereon. The back surface layer of the product was preheated for 30 seconds using a far-infrared heater at 600° C., and then embossed.

Test Examples

Figure 3A:
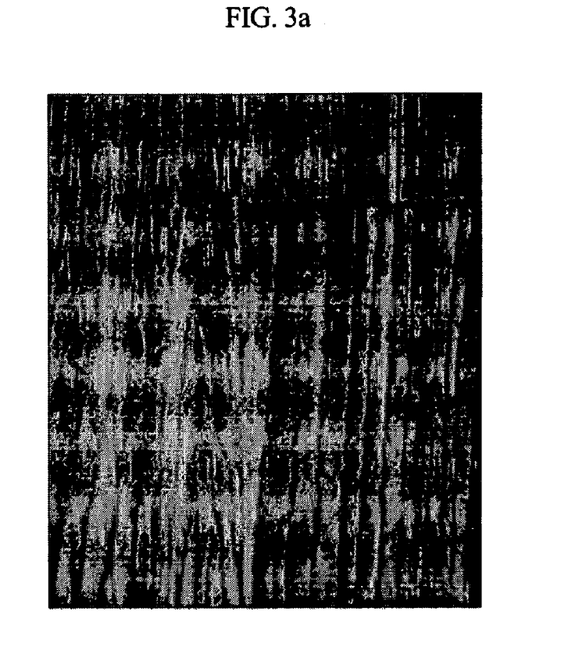
FIGS. 3a to 3c are photographs showing test results for the adhesive strength of a printed ink to conventional floorings and a flooring of the present invention.
Figure 3B:
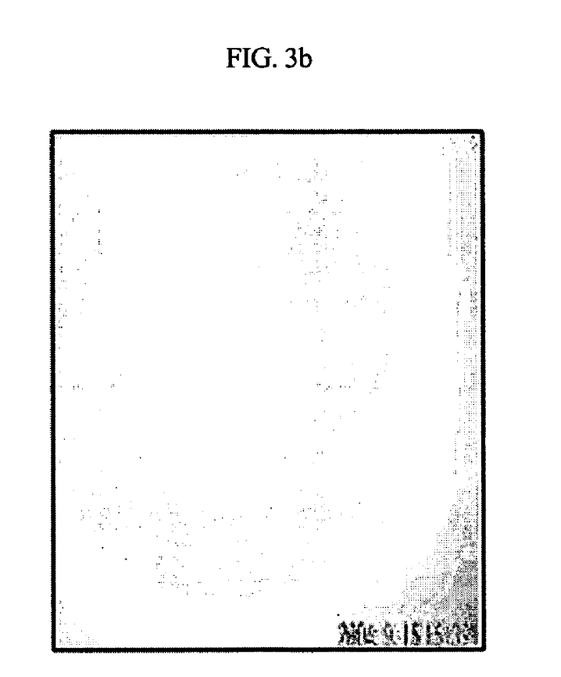
Figure 3C:
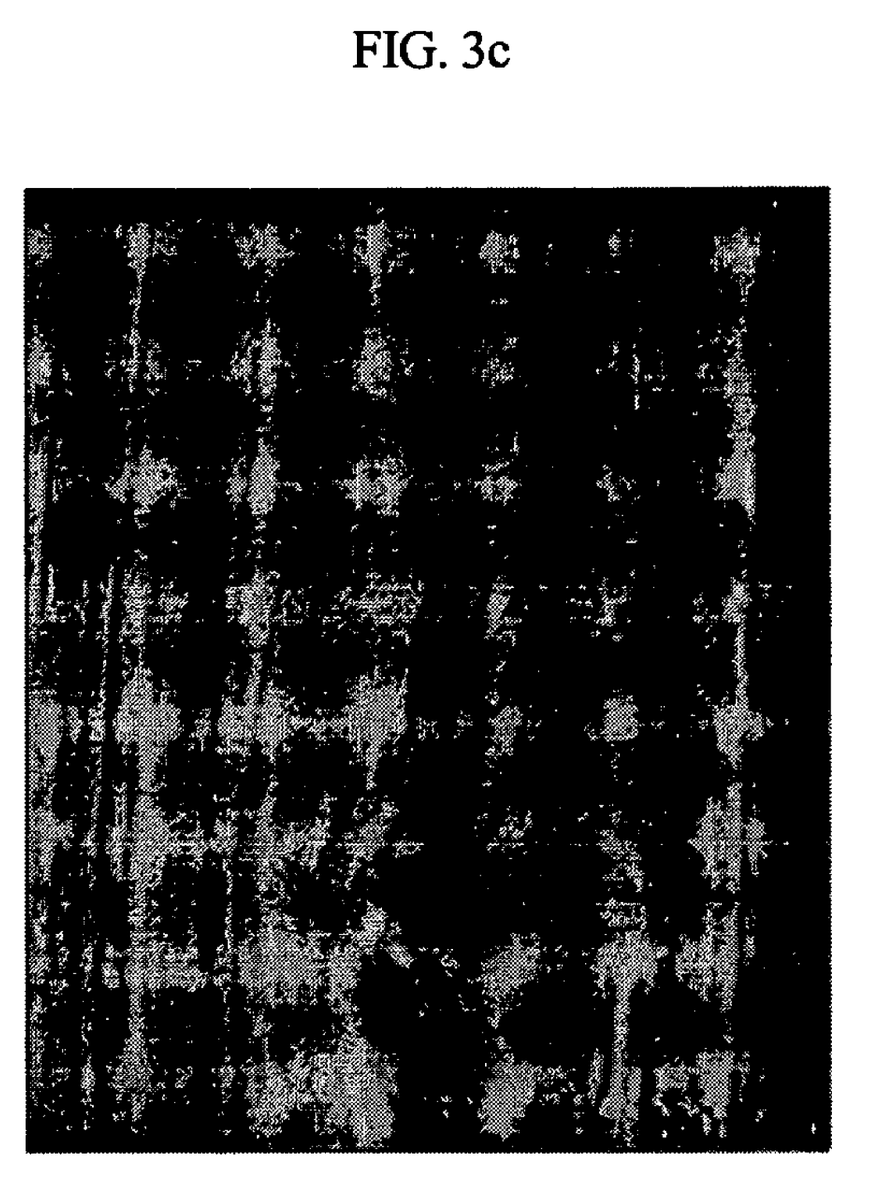

FIGS. 3a to 3c are photographs showing test results for the adhesive strength (by transfer printing) of printed ink to conventional floorings and the flooring of the present invention. The test was conducted in accordance with the following procedure. First, thermal transfer printing was performed using a simple laminator at 110° C. A polyethylene terephthalate (PET) tape was adhered to each of the floorings. After the tape was removed from the flooring, the peeling degree of the ink printed film was observed. As a result, ink peeling was partially observed in the conventional polyvinyl chloride (PVC) flooring (FIG. 3a), there was no adhesion to the PP (+EPDM (ethylene propylene non-conjugated diene rubber)) flooring (FIG. 3b), which indicates that no ink transfer occurred, whereas peeling was not substantially observed in the flooring of the present invention (FIG. 3c), indicating perfect adhesion of the ink.

Figure 4A:
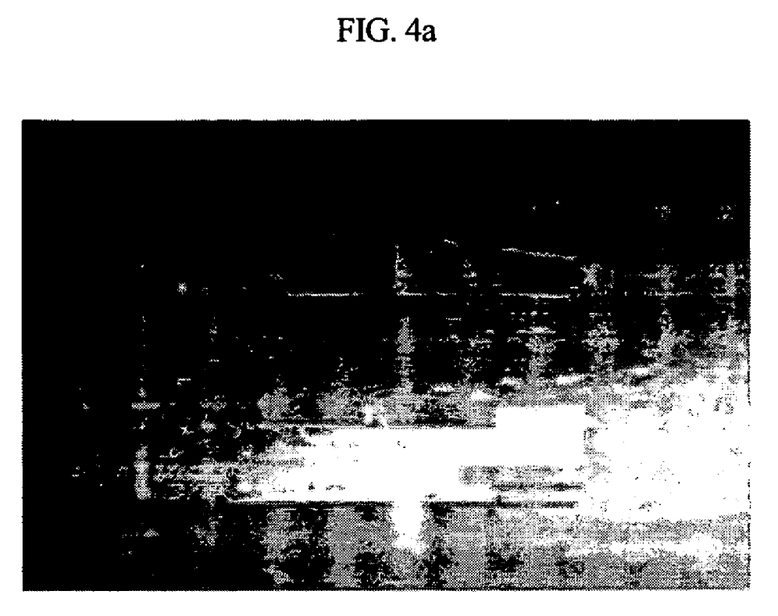
FIGS. 4a and 4b are photographs showing test results for the adhesive strength of a UV primer to a conventional flooring and a flooring of the present invention.
Figure 4B:
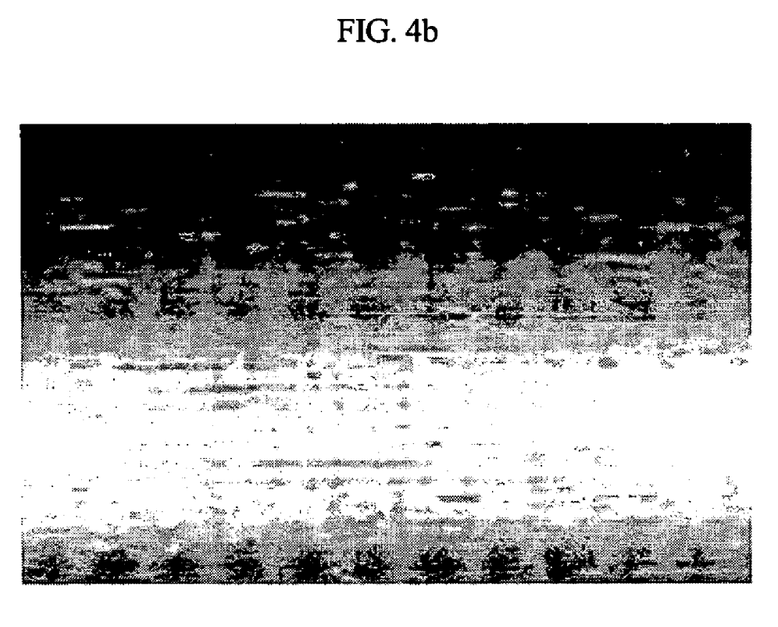

FIGS. 4a and 4b are photographs showing test results for the adhesive strength (UV adhesive properties) of a UV primer to a conventional flooring and the flooring of the present invention. A UV primer was applied to each of the floorings using a #9 bar and completely cured. Thereafter, the surface of the coating film was scratched using a knife, and a PET tape was adhered thereto. After the tape was forcibly removed, the adhesive strength was determined depending on the peeling degree of the UV coating film. As a result, about 60% of the PP (+EPDM; polyolefin resin) flooring was peeled off (FIG. 4a), whereas the UV primer was completely adhered to the flooring of the present invention (FIG. 4b).

INDUSTRIAL APPLICABILITY

As apparent from the foregoing, the flooring of the present invention causes no problems associated with environmental hormones arising from the use of conventional polyvinyl chloride (PVC) floorings and dioxin generated during incineration of the PVC floorings.

In addition, since conventional polyolefin floorings cannot achieve satisfactory molding by calendering and secondary processing (adhesive properties of inks and urethane-acrylate resins) due to the inherent characteristics of the polyolefin resin, they require the use of additional corona treatment equipment and primer processes. In contrast, according to the present invention, a non-polyvinyl chloride flooring can be produced utilizing conventional calendering and coating equipment without the need for additional equipment, which is economically advantageous.

Particularly, the flooring of the present invention has advantages that inks and surface treatment agents can be freely applied to the flooring, no corona and or primer treatment is required, and respective constituent layers can be thermally laminated in a simple manner.

The invention claimed is:

1. A multilayer flooring comprising a non-foamed layer, a sol-impregnated dimension-reinforcing layer, a printed layer, a transparent layer and a surface treatment layer laminated in this order from the bottom to the top,
    wherein each of the transparent layer, the printed layer and the non-foamed layer contains as a base resin a) a hydrogenated styrene-butadiene random copolymer resin, b) a styrene-butadiene block copolymer resin and c) polystyrene,
    wherein the hydrogenated styrene-butadiene random copolymer resin has a polystyrene content of 50 wt % or more and the styrene-butadiene block copolymer resin has a polystyrene content not less than 30 wt %, and
    wherein each of the hydrogenated styrene-butadiene random copolymer resin and the styrene-butadiene block copolymer resin has a melt index (MI, 200° C., 5 kg) of 2~10 g/10 minutes.

2. The flooring according to claim 1, wherein the sol-impregnated dimension-reinforcing layer is formed by impregnating a glass fiber with at least one of a styrene-butadiene latex, an ethylene-vinylacetate sol having a solid content of 50 wt % or more, and a water-dispersed urethane sol.

3. The flooring according to claim 1, wherein each of the transparent layer, the printed layer and the non-foamed layer contains a) 1 to 70 parts by weight of the hydrogenated styrene-butadiene random copolymer resin, b) 1 to 200 parts by weight of the styrene-butadiene block copolymer resin, and c) 1 to 70 parts by weight of the polystyrene.

4. The flooring according to claim 3, wherein each of the transparent layer, the printed layer and the non-foamed layer further contains d) 0.1~3 parts by weight of a UV stabilizer, 0.1~5 parts by weight of an antioxidant and 0.1~3 parts by weight of a lubricant as additives.

5. A method for producing a flooring, comprising the steps of:
    a) forming a transparent layer, a printed layer and a non-foamed layer, each containing, as a base resin, 1) a hydrogenated styrene-butadiene random copolymer resin, 2) a styrene-butadiene block copolymer resin, and 3) polystyrene resin by calendering;
    b) forming a sol-impregnated dimension-reinforcing layer and thermally laminating the printed layer thereto to form a printed sol-impregnated dimension-reinforcing layer;
    c) thermally laminating the transparent layer, the printed sol-impregnated dimension-reinforcing layer, and the non-foamed layer; and d) treating the laminate with a surface treatment agent and embossing the back surface of the laminate wherein the hydrogenated styrene-butadiene random copolymer resin has a polystyrene content of 50 wt % or more and the styrene-butadiene block copolymer resin has a polystyrene content not less than 30 wt % and wherein each of the hydrogenated styrene-butadiene random copolymer resin and the styrene-butadiene block copolymer resin has a melt index (MI, 200° C., 5 kg) of 2~10 g/10 minutes.

* * * * *